United States Patent
Dai et al.

(10) Patent No.: US 8,879,494 B2
(45) Date of Patent: Nov. 4, 2014

(54) METHOD AND SYSTEM FOR NON-PERIODIC FEEDBACK IN CARRIER AGGREGATION SCENARIO

(75) Inventors: Bo Dai, Shenzhen (CN); Xin Wu, Shenzhen (CN); Ping Zeng, Shenzhen (CN); Guanghui Yu, Shenzhen (CN); Zhisong Zuo, Shenzhen (CN)

(73) Assignee: ZTE Corporation, Shenzhen, GD (CN)

( * ) Notice: Subject to any disclaimer, the term of this patent is extended or adjusted under 35 U.S.C. 154(b) by 107 days.

(21) Appl. No.: 13/638,756

(22) PCT Filed: Aug. 19, 2010

(86) PCT No.: PCT/CN2010/076155
§ 371 (c)(1),
(2), (4) Date: Oct. 23, 2012

(87) PCT Pub. No.: WO2011/120277
PCT Pub. Date: Oct. 6, 2011

(65) Prior Publication Data
US 2013/0201929 A1      Aug. 8, 2013

(30) Foreign Application Priority Data
Apr. 1, 2010   (CN) .......................... 2010 1 0146854

(51) Int. Cl.
| | |
|---|---|
| H04W 4/00 | (2009.01) |
| H04L 12/26 | (2006.01) |
| H04W 72/04 | (2009.01) |
| H04L 5/00 | (2006.01) |
| H04W 24/10 | (2009.01) |
| H04W 28/06 | (2009.01) |
| H04W 48/08 | (2009.01) |
| H04W 72/00 | (2009.01) |
| H04B 7/06 | (2006.01) |

(52) U.S. Cl.
CPC ............ *H04W 72/042* (2013.01); *H04W 24/10* (2013.01); *H04L 5/0094* (2013.01); *H04W 28/06* (2013.01); *H04W 72/04* (2013.01); *H04W 48/08* (2013.01); *H04W 72/00* (2013.01); *H04B 7/0643* (2013.01); *H04L 5/001* (2013.01)
USPC .......................................... 370/329; 370/252

(58) Field of Classification Search
None
See application file for complete search history.

(56) References Cited

FOREIGN PATENT DOCUMENTS

| | | |
|---|---|---|
| CN | 101615984 A | 12/2009 |
| CN | 101616484 A | 12/2009 |
| CN | 101621359 A | 1/2010 |

(Continued)

OTHER PUBLICATIONS

Machine Translation of CN101621359 Mar. 20, 2104.*

(Continued)

*Primary Examiner* — Afshawn Towfighi
(74) *Attorney, Agent, or Firm* — Diederiks & Whitelaw, PLC

(57) ABSTRACT

The present invention discloses a method and a system for non-periodic feedback in a carrier aggregation scenario. The method comprises: a base station sending a non-periodic trigger signaling to a piece of User Equipment (UE); the UE receiving the non-periodic trigger signaling, and determining a Downlink Component Carrier (DL CC) requiring feedback according to the non-periodic trigger signaling; the UE triggering a non-periodic feedback of the determined DL CC. With the present invention, the problem that it is impossible to determine which downlink component carrier is to be fed back according to the non-periodic trigger signaling in the carrier aggregation scenario is solved, uplink feedback of the DL CC that is unnecessary to be fed back is effectively reduced, the base station can adjust resource allocation according to information fed back by the UE, and the performance of downlink data transmission is ensured.

9 Claims, 6 Drawing Sheets

(56) References Cited

FOREIGN PATENT DOCUMENTS

| WO | 2009/152657 | A1 | 12/2009 |
|----|-------------|----|---------|
| WO | 2011/120277 |    | 10/2011 |

OTHER PUBLICATIONS

An English Translation of the International Search Report and the Written Opinion both dated Jan. 6, 2011, which issued during the prosecution of Applicant's PCT/CN2010/076155.

An English Translation of the International Preliminary Report on Patentability dated Oct. 2, 2012, which issued during the prosecution of Applicant's PCT/CN2010/076155.

Panasonic, "*Aperiodic CQI Reporting for Carrier Aggregation*", 3gPP TSG-RAN WG1 Meeting 60, R1-101262, San Francisco, pp. 1-2, Feb. 22-26, 2010.

\* cited by examiner

US 8,879,494 B2

METHOD AND SYSTEM FOR NON-PERIODIC FEEDBACK IN CARRIER AGGREGATION SCENARIO

CROSS-REFERENCE TO RELATED APPLICATIONS

This application represents a National Stage application of PCT/CN2010/076155 entitled "Method and System for Aperiodic Feedback Under Carrier Aggregation Scene" filed Aug. 19, 2010, pending.

FIELD OF THE INVENTION

The present invention relates to the field of communications, and in particular to a method and a system for non-periodic feedback in a carrier aggregation scenario.

BACKGROUND OF THE INVENTION

A radio frame in a Long Term Evolution (LTE) system comprises frame structures in a Frequency Division Duplex (FDD) mode and in a Time Division Duplex (TDD) mode. As shown in FIG. 1, in the frame structure in the FDD mode, one radio frame of 10 ms is composed of 20 time slots, wherein the length of each time slot is 0.5 ms and the 20 time slots are numbered from 0 to 19; the time slots $2i$ and $2i+1$ compose a subframe i, the length of which is 1 ms. As shown in FIG. 2, in the frame structure in the TDD mode, one radio frame of 10 ms is composed of two half frames, wherein the length of each half frame is 5 ms; one half frame comprises 5 subframes, wherein the length of each subframe is 1 ms; the subframe i is defined as two time slots $2i$ and $2i+1$, wherein the length of each time slot is 0.5 ms. In the above-mentioned two frame structures, for a Normal Cyclic Prefix (Normal CP), one time slot comprises 7 symbols, wherein the length of each symbol is 66.7 us, and a CP length of the first symbol is 5.21 us, and lengths of the rest 6 symbols are 4.69 us; for an Extended Cyclic Prefix (Extended CP), one time slot comprises 6 symbols, wherein the CP lengths of all the symbols are 16.67 us.

A piece of User Equipment (UE) obtains downlink channel quality information according to a downlink pilot frequency (reference signal), and then feeds back the obtained downlink channel quality information to an eNB (base station); the base station determines a code modulation mode of data sent to the UE, a physical resource location and a transmission mode according to the downlink channel quality information fed back by the UE. There are two ways of feeding back the downlink channel quality information by the UE, one is periodic feedback, and the other is non-periodic feedback, wherein the periodic feedback is performing feedback according to a prescribed period, and the non-periodic feedback is that the base station triggers the UE to perform feedback through a downlink signaling.

In the LTE system, the base station triggers the UE to perform non-periodic feedback through 1-bit signaling in a Downlink Control Information (DCI) format 0; furthermore, feedback information is borne through a Physical Uplink Shared Channel (PUSCH), and the DCI information is transmitted through a Physical Downlink Control Channel (PDCCH).

A Long-Term Evolution Advanced (LTE-A) system is an evolution version of LTE Release-8. An advanced international wireless communication system presented by International Telecommunications Union-Radio Communications Sector (ITU-R) requires backward compatibility. Requirement for backward compatibility between the LTE-Advanced and the LTE Release-8 means that the UE of the LTE Release-8 can operate in an LTE-Advanced network; and the UE of the LTE-Advanced can operate in an LTE Release-8 network. In addition, the LTE-Advanced should be able to operate in configurations of frequency spectrum with different sizes, comprising configuration of frequency spectrum which is wider than that of the LTE Release-8 (e.g., the configuration of wider frequency spectrum being continuous frequency spectrum resource of 100 MHz), so as to achieve higher performance and target peak rate. In view of the compatibility with the LTE Release-8, for bandwidth which is more than 20 MHz, a way of carrier aggregation is adopted, that is, two or more than two component carriers (CC) are aggregated to support downlink transmission bandwidth which is more than 20 MHz. In the LTE-A system, it is supported that a Downlink Component Carrier (DL CC) sends scheduling information (DCI Format) of other DL CC, and a Carrier Indicator (CI) signaling is introduced in a DCI Format domain for identifying the scheduled DL CC or Uplink Component Carrier (UL CC).

The inventor finds that when multiple component carries are aggregated, meaning of a non-periodic trigger signaling is not defined in relevant technologies, that is, it is not indicated in the non-periodic trigger signaling that the downlink channel quality information of which component carrier is to be triggered non-periodically, as a result, the UE is unable to determine which downlink component carrier is to be fed back according to the non-periodic trigger signaling, and further the base station is unable to ensure the performance of downlink data transmission. Aiming at the problem, no effective solution has been presented.

SUMMARY OF THE INVENTION

The present invention mainly provides a method and a system for non-periodic feedback in a carrier aggregation scenario, which at least solve the above-mentioned problem.

According to one aspect of the present invention, a method for non-periodic feedback in a carrier aggregation scenario is provided, which comprises: a base station sending a non-periodic trigger signaling to a piece of UE; the UE receiving the non-periodic trigger signaling, and determining a DL CC requiring feedback according to the non-periodic trigger signaling; and the UE triggering a non-periodic feedback of the determined DL CC.

According to another aspect of the present invention, a system for non-periodic feedback in a carrier aggregation scenario is provided, which comprises a base station and a piece of UE; wherein the base station is configured to send a non-periodic trigger signaling to the UE; the UE comprises: a receiving module, which is configured to receive the non-periodic trigger signaling from the base station; and a triggering module, which is configured to determine a DL CC requiring feedback according to the non-periodic trigger signaling, and trigger a non-periodic feedback of the determined DL CC.

Through the present invention, when trigger of the base station is received by the UE, a DL CC requiring feedback is first determined, and then the non-periodic feedback of the DL CC is triggered, the problem that it is impossible to determine which downlink component carrier is to be fed back according to the non-periodic trigger signaling in the carrier aggregation scenario is solved, uplink feedback of the DL CC that is unnecessary to be fed back is effectively reduced, the base station can adjust resource allocation according to information fed back by the UE, and the performance of downlink data transmission is ensured.

BRIEF DESCRIPTION OF THE DRAWINGS

Drawings, provided for further understanding of the present invention and forming a part of the specification, are used to explain the present invention together with embodiments of the present invention rather than to limit the present invention, wherein.

DETAILED DESCRIPTION OF THE EMBODIMENTS

The present invention is described below with reference to the accompanying drawings and embodiments in detail. Note that, embodiments and features in embodiments in the application can be combined with each other on condition of not conflicting.

Figure 1:
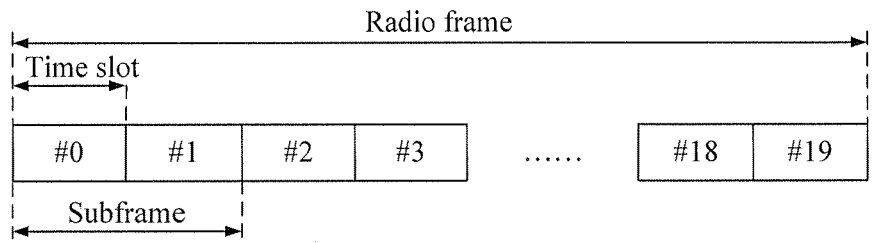
FIG. 1 shows a schematic diagram of a frame structure in an FDD mode according to relevant technologies.
Figure 2:
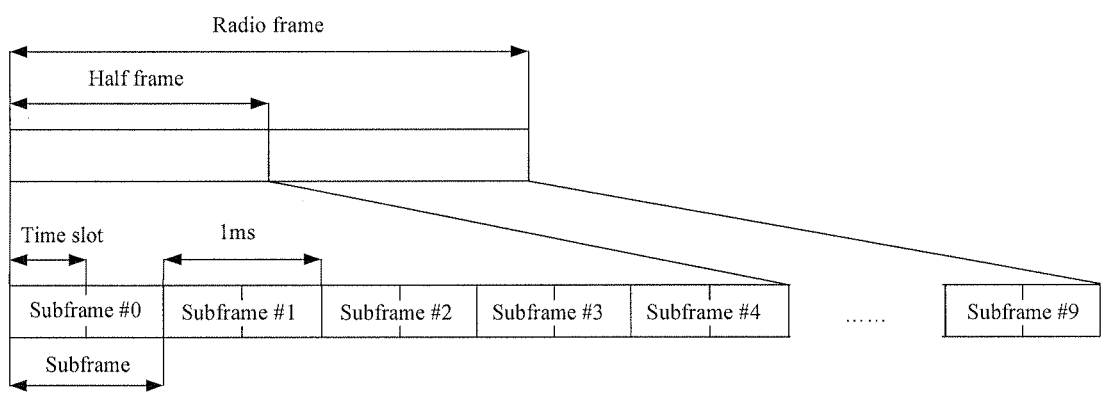
FIG. 2 shows a schematic diagram of a frame structure in a TDD mode according to relevant technologies.
Figure 3:
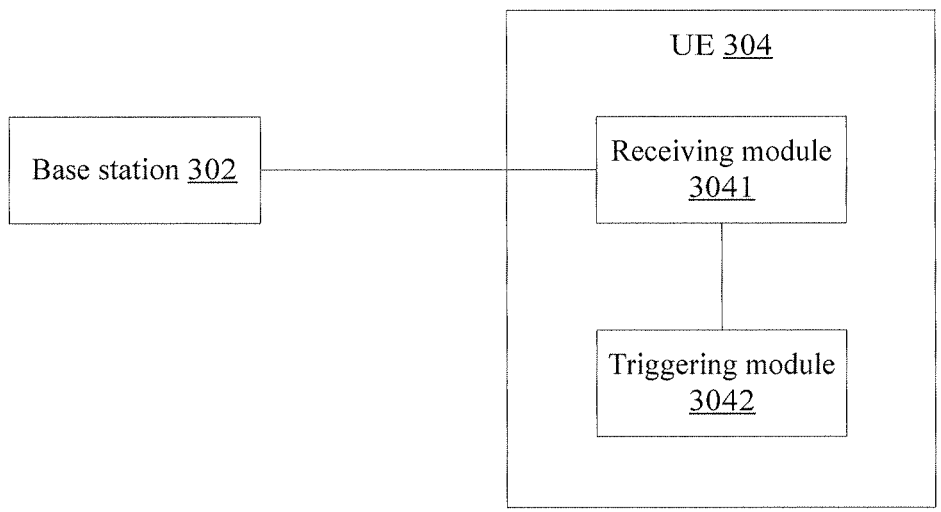
FIG. 3 shows a structure diagram of a system for non-periodic feedback in a carrier aggregation scenario according to an embodiment of the present invention.

In a carrier aggregation scenario, a base station triggers a UE to perform a non-periodic feedback by sending a non-periodic trigger signaling; the UE determines which downlink component carrier is to be triggered according to the signaling, and further completes the process of non-periodic feedback. Based on that, an embodiment of the present invention provides a system for non-periodic feedback in a carrier aggregation scenario. With reference to FIG. 3, the system comprises a base station 302 and a UE 304;

the base station 302 is configured to send a non-periodic trigger signaling to the UE 304; and the UE 304 comprises: a receiving module 3041, which is configured to receive the non-periodic trigger signaling from the base station 302; and a triggering module 3042, which is configured to determine a DL CC requiring feedback according to the non-periodic trigger signaling, and trigger a non-periodic feedback of the determined DL CC.

In accordance with the embodiment, when receiving a trigger from the base station, the UE determines the DL CC requiring feedback, and then triggers the non-periodic feedback of the DL CC; therefore, uplink feedback of the DL CC that is unnecessary to be fed back is effectively reduced, the base station can adjust resource allocation according to information fed back by the UE, and the performance of downlink data transmission is ensured.

Figure 4:
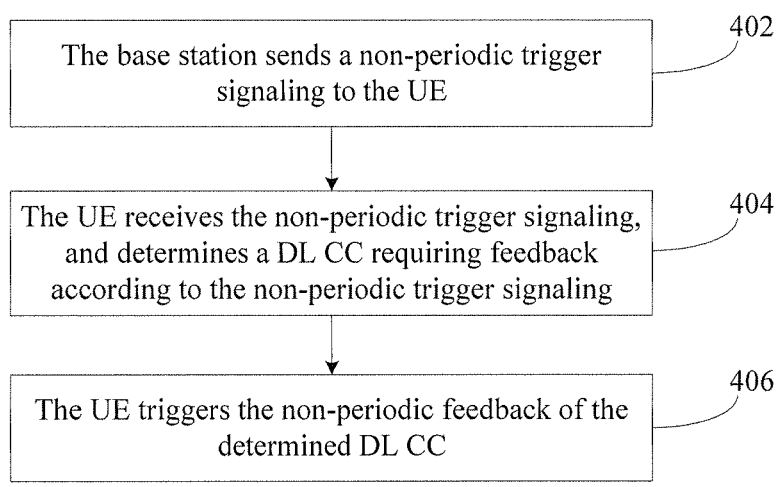
FIG. 4 shows a flowchart of a method for non-periodic feedback in a carrier aggregation scenario according to an embodiment of the present invention.

Based on the system, an embodiment of the present invention also provides a method for non-periodic feedback in a carrier aggregation scenario. With reference to FIG. 4, the method comprises the following steps:

Step 402: the base station sends the non-periodic trigger signaling to the UE;

Step 404: the UE receives the non-periodic trigger signaling, and determines the DL CC requiring feedback according to the non-periodic trigger signaling; and Step 406: the UE triggers the non-periodic feedback of the determined DL CC.

In accordance with the embodiment, when receiving a trigger from the base station, the UE determines the DL CC requiring feedback, and then triggers non-periodic feedback of the DL CC; therefore, uplink feedback of the DL CC that is unnecessary to be fed back is effectively reduced, the base station can adjust resource allocation according to information fed back by the UE, and the performance of downlink data transmission is ensured.

Preferably, during a cross-carrier scheduling, the non-periodic trigger signaling is a CI signaling for the cross-carrier scheduling.

Preferably, when the UE determines there are multiple DL CCs requiring feedback, the step that the UE triggers the non-periodic feedback of the determined DL CCs comprises that: the UE arranges channel quality information of the multiple DL CCs according to an order of frequency points or an order of indexes of the DL CCs, and sends the arranged channel quality information of the multiple DL CCs to the base station. For example, the channel quality information of the multiple DL CCs is arranged in a descending order or an ascending order of the frequency points, or, arranged in a descending order or an ascending order of the indexes of the DL CCs.

There are multiple ways of determining the DL CC requiring feedback, for example, an implied mapping way, a pre-definition way or a signaling indicating way; wherein the implied mapping way can be any one of the following:

1) the UE determines a DL CC bearing the non-periodic trigger signaling to be the DL CC requiring feedback;

2) the UE determines a DL CC bearing the non-periodic trigger signaling to be a first DL CC, and the UE determines all DL CCs which send scheduling information on the first DL CC to be the DL CCs requiring feedback;

3) the UE stores a correspondence between a DL CC and a UL CC; the UE determines a first UL CC according to scheduling information bearing the non-periodic trigger signaling, searches for a DL CC to which the first UL CC corresponds according to the stored correspondence between the DL CC and the UL CC, and determines the found DL CC to be the DL CC requiring feedback; wherein the first UL CC is an uplink component carrier for sending a PUSCH bearing non-periodic feedback information.

Determining the DL CC requiring feedback in the predefinition way can use the following method:

1) the base station pre-configures the UE to receive data on specified DL CCs; when the UE receives the non-periodic trigger signaling on one of the specified DL CCs, the UE determines the specified DL CCs to be the DL CCs requiring feedback; wherein the specified DL CCs can be all DL CCs which are pre-configured to the UE by the base station and have a capability of receiving data, so there can be multiple DL CCs;

2) the base station pre-configures a first correspondence through a high-layer signalling, wherein the first correspondence is a correspondence between a DL CC receiving the non-periodic trigger signaling and the DL CC requiring feedback; the UE determines the DL CC requiring feedback to which the DL CC bearing the non-periodic trigger signaling corresponds according to the first correspondence.

The non-periodic trigger signaling in above-mentioned implied mapping way and predefinition way is in a DCI Format domain which bears scheduling information of the PUSCH.

Determining the DL CC requiring feedback in the signaling indicating way can use the following method:

1) the non-periodic trigger signaling is n bits, wherein n is more than 1; each bit in the n bits corresponds to one DL CC, and when the value of a bit is a specified value, it indicates triggering the non-periodic feedback of the DL CC to which the bit corresponds; when receiving the non-periodic trigger signaling, the UE determines whether there is the specified value in the n bits, if so, determines the DL CC to which the bit, where the specified value is, corresponds to be the DL CC requiring feedback;

2) the non-periodic trigger signaling is n bits, wherein n is more than 1; a decimal number of the n bits corresponds to one DL CC, or the non-periodic feedback is not triggered; when receiving the non-periodic trigger signaling, the UE determines the DL CC to which the decimal number of the n bits corresponds to be the DL CC requiring feedback.

The uplink carrier for sending the PUSCH which bears non-periodic feedback information is predefined by the base station through the high-layer signaling.

The value of n in the signaling indicating way is one of the followings: the maximum number of component carriers aggregated in the system; the number of the DL CCs, which are configured to the UE by the base station, for transmitting a Physical Downlink Shared Channel (PDSCH); the maximum number of carriers which are configured to the UE by the base station to schedule a DL CC on one DL CC; the maximum number of carriers which are configured to the UE by the base station to schedule a DL CC on the DL CC sending the non-periodic trigger signaling.

The above-mentioned three ways are described below with reference to specific examples. The methods provided in examples 1 to 7 can be applied to either cross-carrier scheduling or non-cross-carrier scheduling. In practical applications, these methods can be used in any combination, for example, any two methods are selected from examples 1 to 7, one is used for the cross-carrier scheduling, and the other is used for the non-cross-carrier scheduling.

Example 1

Figure 5:
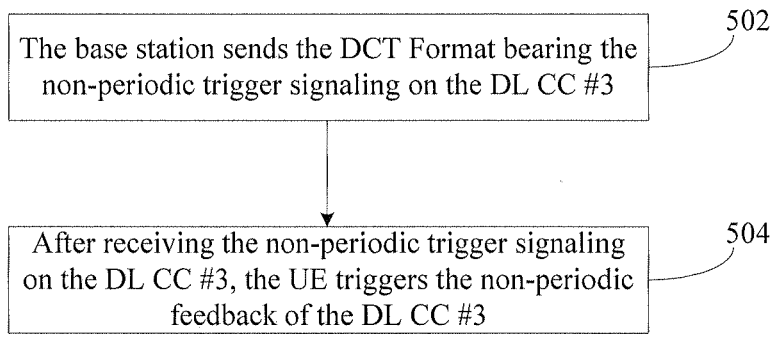
FIG. 5 shows a flowchart of a method for non-periodic feedback in a carrier aggregation scenario according to example 1 of the present invention.

The example provides a method for non-periodic feedback in a carrier aggregation scenario. In the example, there are 5 DL CCs and 5 UL CCs supported by the UE; the DL CCs and the UL CCs are numbered respectively; and the DL CCs and the UL CCs are in one-to-one mapping relation according to their numbers. With reference to FIG. 5, the method comprises the following steps:

Step 502: the base station sends, on the DL CC #3, a DCI Format bearing the non-periodic trigger signaling;

Step 504: after receiving the non-periodic trigger signaling on the DL CC #3, the UE triggers the non-periodic feedback of the DL CC #3.

The non-periodic trigger signaling in the example is 1 bit, and the non-periodic trigger signaling indicates triggering the non-periodic feedback of a target DL CC, wherein the target DL CC is the DL CC sending the trigger signaling.

The non-periodic trigger signaling in the example is in the DCI Format domain which bears scheduling information of the PUSCH.

In the example, the UE regards the DL CC receiving the non-periodic trigger signaling as the DL CC requiring feedback, which solves the problem that it is impossible to determine the DL CC requiring feedback in the carrier aggregation scenario, and the method is simple to implement without increasing any signaling overhead. At the same time, uplink feedback of the DL CC that is unnecessary to be fed back is effectively reduced, the base station can adjust resource allocation according to information fed back by the UE, and the performance of downlink data transmission is ensured.

Example 2

Figure 6:
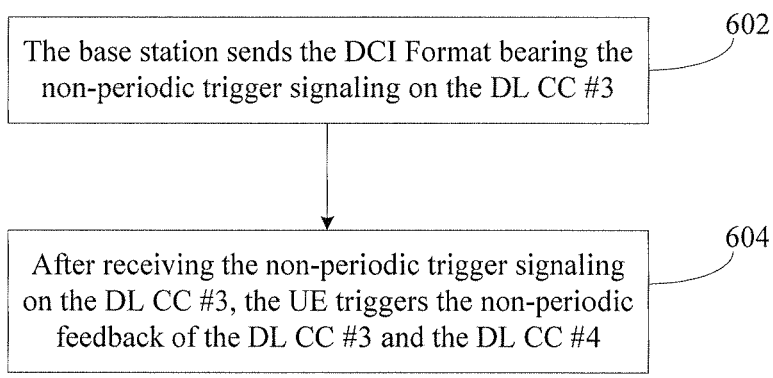
FIG. 6 shows a flowchart of a method for non-periodic feedback in a carrier aggregation scenario according to example 2 of the present invention.

The example provides a method for non-periodic feedback in a carrier aggregation scenario. In the example, there are 4 DL CCs and 4 UL CCs supported by the UE; the DL CCs and the UL CCs are numbered respectively; the DL CCs and the UL CCs are in one-to-one mapping relation according to their numbers. For the UE, scheduling information of the PDSCH of the DL CC #1 and the DL CC #2 is sent on the DL CC #2, and scheduling information of the PDSCH of the DL CC #3 and the DL CC #4 is sent on the DL CC #3. With reference to FIG. 6, the method comprises the following steps:

Step 602: the base station sends, on the DL CC #3, the DCI Format bearing the non-periodic trigger signaling;

Step 604: after receiving the non-periodic trigger signaling on the DL CC #3, the UE triggers the non-periodic feedback of the DL CC #3 and the DL CC #4.

In the example, the non-periodic trigger signaling is 1 bit, and the non-periodic trigger signaling indicates triggering the non-periodic feedback of target DL CCs, wherein the target DL CCs are all DL CCs that the UE can schedule on the DL CC sending the trigger signaling.

In the example, the non-periodic trigger signaling is in the DCI Format domain which bears scheduling information of the PUSCH.

In the example, the UE regards the DL CC #3 and the DL CC #4 to which the DL CC #3 receiving the non-periodic trigger signaling corresponds as the DL CCs requiring feedback, which solves the problem that it is impossible to determine the DL CCs requiring feedback in the carrier aggregation scenario, and the method is simple to implement without increasing any signaling overhead. At the same time, uplink feedback of the DL CC that is unnecessary to be fed back is effectively reduced, the base station can adjust resource allocation according to information fed back by the UE, and the performance of downlink data transmission is ensured.

Example 3

Figure 7:
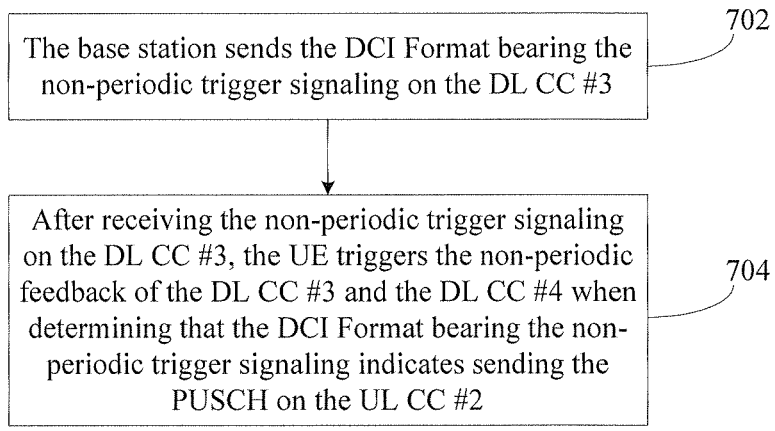
FIG. 7 shows a flowchart of a method for non-periodic feedback in a carrier aggregation scenario according to example 3 of the present invention.

The example provides a method for non-periodic feedback in a carrier aggregation scenario. In the example, there are 4 DL CCs and 2 UL CCs supported by the UE; the DL CCs and the UL CCs are numbered respectively. For the UE, the DL CC #1 and the DL CC #2 correspond to the UL CC #1, and the DL CC #3 and the DL CC #4 correspond to the UL CC #2. With reference to FIG. 7, the method comprises the following steps:

Step 702: the base station sends, on the DL CC #3, the DCI Format bearing the non-periodic trigger signaling;

Step 704: after receiving the non-periodic trigger signaling on the DL CC #3, the UE triggers the non-periodic feedback of the DL CC #3 and the DL CC #4 when determining that the DCI Format bearing the non-periodic trigger signaling indicates sending the PUSCH on the UL CC #2.

Information of the DL CC to which the UL CC corresponds is configured to the UE by the base station through a signaling.

In the example, the non-periodic trigger signaling is 1 bit, and the non-periodic trigger signaling indicates triggering the non-periodic feedback of target DL CCs, wherein the target DL CCs are all DL CCs to which the UL CC, where the PUSCH sending non-periodic feedback information is, corresponds.

In the example, the non-periodic trigger signaling is in the DCI Format domain which bears scheduling information of the PUSCH.

In the example, the UE determines the UL CC #2 according to the DL CC #3 receiving the non-periodic trigger signaling, and regards the DL CC #3 and the DL CC #4 as the DL CCs requiring feedback according to information of the DL CCs to which the UL CC corresponds, which solves the problem that it is impossible to determine the DL CC requiring feedback in the carrier aggregation scenario, and the method is simple to implement without increasing any signaling overhead. At the same time, uplink feedback of the DL CC that is unnecessary to be fed back is effectively reduced, the base station can adjust resource allocation according to information fed back by the UE, and the performance of downlink data transmission is ensured.

Example 4

Figure 8:
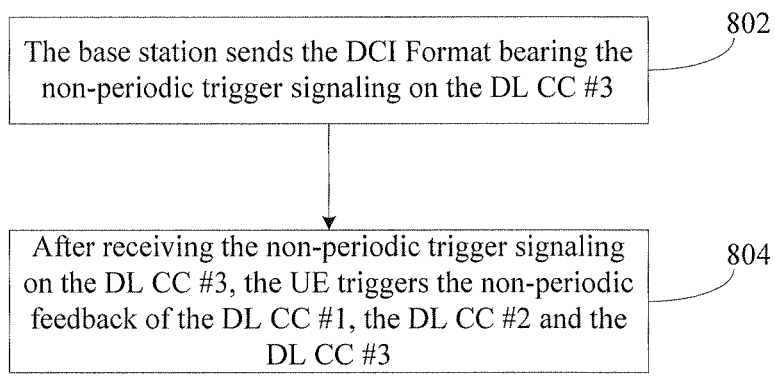
FIG. 8 shows a flowchart of a method for non-periodic feedback in a carrier aggregation scenario according to example 4 of the present invention.

The example provides a method for non-periodic feedback in a carrier aggregation scenario. In the example, there are 5 DL CCs and 5 UL CCs supported by the UE; the DL CCs and the UL CCs are in one-to-one mapping relation according to their numbers. The base station pre-configures the UE to receive data on the DL CC #1, the DL CC #2 and the DL CC #3. With reference to FIG. 8, the method comprises the following steps:

Step 802: the base station sends, on the DL CC #3, the DCI Format bearing the non-periodic trigger signaling;

Step 804: after receiving the non-periodic trigger signaling on the DL CC #3, the UE triggers the non-periodic feedback of the DL CC #1, the DL CC #2 and the DL CC #3.

In the example, the non-periodic trigger signaling is 1 bit, and the non-periodic trigger signaling indicates triggering the non-periodic feedback of target DL CCs, wherein the target DL CCs are all DL CCs, which are configured to the UE by the base station, for transmitting the PDSCH.

In the example, the non-periodic trigger signaling is in the DCI Format domain which bears scheduling information of the PUSCH.

In the example, after receiving the non-periodic trigger signaling, the UE regards the DL CC #1, the DL CC #2 and the DL CC #3 as the DL CCs requiring feedback according to the configuration information, which solves the problem that it is impossible to determine the DL CCs requiring feedback in the carrier aggregation scenario, and the method is simple to implement without increasing any signaling overhead. At the same time, uplink feedback of the DL CC that is unnecessary to be fed back is effectively reduced, the base station can adjust resource allocation according to information fed back by the UE, and the performance of downlink data transmission is ensured.

Example 5

Figure 9:
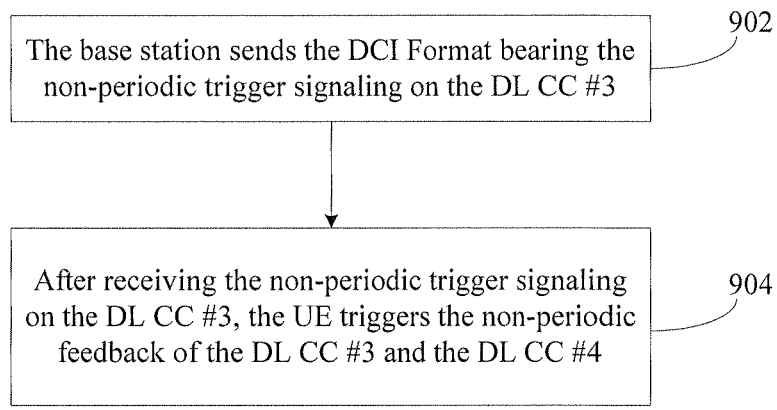
FIG. 9 shows a flowchart of a method for non-periodic feedback in a carrier aggregation scenario according to example 5 of the present invention.

The example provides a method for non-periodic feedback in a carrier aggregation scenario. In the example, there are 5 DL CCs and 5 UL CCs supported by the UE; the DL CCs and the UL CCs are in one-to-one mapping relation according to their numbers. The base station configures, through a high-layer (RRC) signaling, the UE to trigger the non-periodic feedback of the DL CC #3 and the DL CC #4 when receiving the non-periodic trigger signaling on the DL CC #3. With reference to FIG. 9, the method comprises the following steps:

Step 902: the base station sends, on the DL CC #3, the DCI Format bearing the non-periodic trigger signaling;

Step 904: after receiving the non-periodic trigger signaling on the DL CC #3, the UE triggers the non-periodic feedback of the DL CC #3 and the DL CC #4.

In the example, the non-periodic trigger signaling is 1 bit, and the non-periodic trigger signaling indicates triggering the non-periodic feedback of a target DL CC, wherein the target DL CC is configured by the base station through a high-layer signaling.

In the example, the non-periodic trigger signaling is in the DCI Format domain which bears scheduling information of the PUSCH.

In the example, after receiving the non-periodic trigger signaling on the DL CC #3, the UE regards the DL CC #3 and the DL CC #4 as the DL CCs requiring feedback according to the configuration information, which solves the problem that it is impossible to determine the DL CC requiring feedback in the carrier aggregation scenario, and the method is simple to implement without increasing any signaling overhead. At the same time, uplink feedback of the DL CC that is unnecessary to be fed back is effectively reduced, the base station can adjust resource allocation according to information fed back by the UE, and the performance of downlink data transmission is ensured.

Example 6

Figure 10:
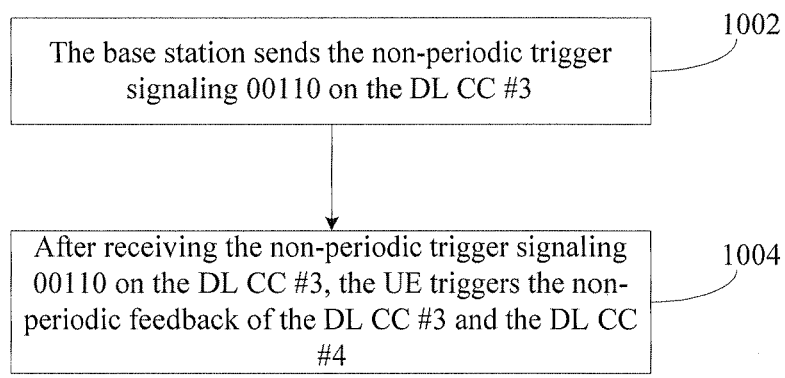
FIG. 10 shows a flowchart of a method for non-periodic feedback in a carrier aggregation scenario according to example 6 of the present invention.

The example provides a method for non-periodic feedback in a carrier aggregation scenario. In the example, there are 5 DL CCs and 5 UL CCs supported by the UE; the DL CCs and the UL CCs are in one-to-one mapping relation according to their numbers. The non-periodic trigger signaling is n (n is equal to 5) bits, and each bit indicates whether the non-periodic feedback of one DL CC is to be triggered, wherein 1 indicates the DL CC is to be triggered, and 0 indicates the DL CC is not to be triggered. With reference to FIG. 10, the method comprises the following steps:

Step 1002: the base station sends the non-periodic trigger signaling 00110 on the DL CC #3;

Step 1004: after receiving the non-periodic trigger signaling 00110 on the DL CC #3, the UE triggers the non-periodic feedback of the DL CC #3 and the DL CC #4.

In the example, the non-periodic trigger signaling is n bits; each bit indicates whether the non-periodic feedback of one DL CC is to be triggered, and the DL CC to which each bit corresponds is different from another. The non-periodic trigger signaling indicates triggering the non-periodic feedback of a target DL CC, wherein the target DL CC is determined by the non-periodic trigger signaling.

In the example, after receiving the non-periodic trigger signaling 00110 on the DL CC #3, the UE regards the DL CC #3 and the DL CC #4 as the DL CCs requiring feedback, which solves the problem that it is impossible to determine the DL CCs requiring feedback in the carrier aggregation scenario, and the method is simple to implement. At the same time, uplink feedback of the DL CC that is unnecessary to be fed back is effectively reduced, the base station can adjust resource allocation according to information fed back by the UE, and the performance of downlink data transmission is ensured.

Example 7

Figure 11:
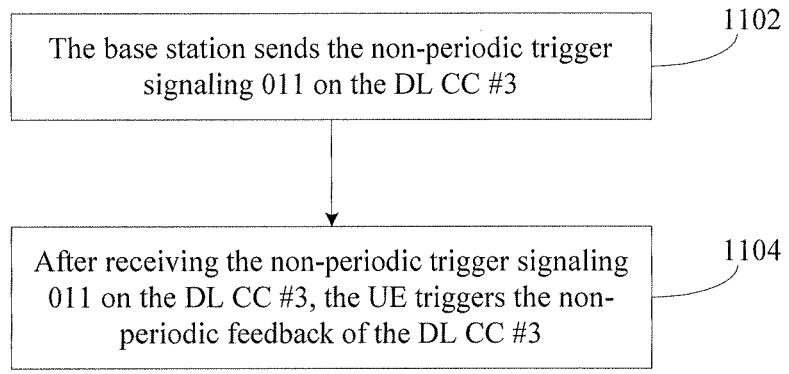
FIG. 11 shows a flowchart of a method for non-periodic feedback in a carrier aggregation scenario according to example 7 of the present invention.

The example provides a method for non-periodic feedback in a carrier aggregation scenario. In the example, there are 5 DL CCs and 5 UL CCs supported by the UE; the DL CCs and the UL CCs are in one-to-one mapping relation according to their numbers. The non-periodic trigger signaling is n (n is equal to 3) bits which indicate 6 states, comprising indexes of the DL CCs to be triggered and not triggering any DL CC, wherein 111 indicates not to trigger any DL CC, 000-100 correspond to the indexes of the triggered DL CCs respectively. With reference to FIG. 11, the method comprises the following steps:

Step 1102: the base station sends the non-periodic trigger signaling 011 on the DL CC #3;

Step 1104: after receiving the non-periodic trigger signaling 011 on the DL CC #3, the UE triggers the non-periodic feedback of the DL CC #3.

The non-periodic trigger signaling indicates triggering the non-periodic feedback of a target DL CC, wherein the target DL CC is determined by the non-periodic trigger signaling. In the example, the non-periodic trigger signaling is n bits which indicate whether to trigger the non-periodic feedback or indicate the index of the DL CC for which the non-periodic feedback is triggered.

In the example, after receiving the non-periodic trigger signaling 011, the UE regards the DL CC #3 as the DL CC requiring feedback, which solves the problem that it is impossible to determine the DL CC requiring feedback in the carrier aggregation scenario, and the method is simple to implement. At the same time, uplink feedback of the DL CC that is unnecessary to be fed back is effectively reduced, the base station can adjust resource allocation according to information fed back by the UE, and the performance of downlink data transmission is ensured.

Example 8

Figure 12:
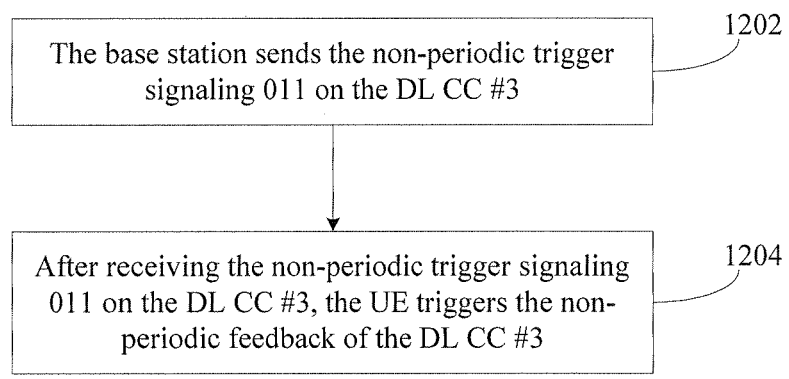
FIG. 12 shows a flowchart of a method for non-periodic feedback in a carrier aggregation scenario according to example 8 of the present invention.

The example provides a method for non-periodic feedback in a carrier aggregation scenario. In the example, during a cross-carrier scheduling, the non-periodic trigger signaling is the CI signaling for the cross-carrier scheduling, and the UL CC of the PUSCH sending the non-periodic feedback is configured through a high-layer signaling. There are 5 DL CCs and 5 UL CCs supported by the UE. The non-periodic trigger signaling is n (n is equal to 3) bits which indicate 6 states, comprising indexes of the DL CCs to be triggered and not triggering any DL CC, wherein 111 indicates not to trigger any DL CC, 000-100 correspond to the indexes of the triggered DL CCs respectively. Besides, the base station configures the UL CC of the PUSCH sending the non-periodic feedback by the UE as UL CC1, then the CI signaling in the DCI Format is reused as the non-periodic trigger signaling during the cross-carrier scheduling. With reference to FIG. 12, the method comprises the following steps:

Step 1202: the base station sends the non-periodic trigger signaling 011 on the DL CC #3;

Step 1204: after receiving the non-periodic trigger signaling 011 on the DL CC #3, the UE triggers the non-periodic feedback of the DL CC #3.

In the example, after receiving the non-periodic trigger signaling 011, the UE regards the DL CC #3 as the DL CC requiring feedback, which solves the problem that it is impossible to determine the DL CC requiring feedback in the carrier aggregation scenario, and the method is simple to implement. At the same time, uplink feedback of the DL CC that is unnecessary to be fed back is effectively reduced, the base station can adjust resource allocation according to information fed back by the UE, and the performance of downlink data transmission is ensured.

For the above example, when the cross-carrier scheduling is disabled, the system can use the example 1; when the cross-carrier scheduling is enabled, the system can use the other examples.

When the UE feeds back channel conditions of multiple DL CCs on the PUSCH non-periodically, channel information of each DL CC is arranged in a descending order or an ascending order of frequency points; or, channel information of each DL CC is arranged in a descending order or an ascending order of indexes of the DL CCs; the arranged channel conditions of multiple DL CCs are sent to the base station through the PUSCH on the target UL CC.

The DL CC and the UL CC supported by the UE in the above examples 1 to 8 are not limited to the above-mentioned specific numbers; and the number of the supported DL CCs and the number of the supported UL CCs can be configured according to the requirement of use, and all these applications fall within the scope of the present invention.

It can be seen from above description that the embodiments of the present invention achieves the following technical effects: the embodiments of the present invention determine the DL CC requiring feedback when triggering the non-periodic feedback in the implied mapping way, the predefinition way or the signaling indicating way, thereby ensuring the base station to trigger the non-periodic feedback of the DL CC flexibly, reducing waste of uplink feedback, and ensuring the performance of downlink data transmission.

Obviously, those skilled in the art shall understand that the above-mentioned modules and steps of the present invention can be realized by using general purpose calculating device, can be integrated in one calculating device or distributed on a network which consists of a plurality of calculating devices. Alternatively, the modules and the steps of the present invention can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the present invention is not restricted to any particular hardware and software combination.

The descriptions above are only the preferable embodiment of the present invention, which are not used to restrict the present invention. For those skilled in the art, the present invention may have various changes and variations. Any amendments, equivalent substitutions, improvements, etc. within the principle of the present invention are all included in the scope of the protection of the present invention.

What is claimed is:

1. A method for non-periodic feedback in a carrier aggregation scenario, comprising:

a base station sending a non-periodic trigger signaling to a piece of User Equipment (UE);

the UE receiving the non-periodic trigger signaling, and determining a Downlink Component Carrier (DL CC) requiring feedback according to the non-periodic trigger signaling; and the UE triggering a non-periodic feedback of the determined DL CCU;

wherein the step of determining the DL CC requiring feedback according to the non-periodic trigger signaling comprises: the UE determining a DL CC bearing the non-periodic trigger signaling to be the DL CC requiring feedback; or the UE determines a DL CC bearing the non-periodic trigger signaling to be a first DL CC; and the step of determining the DL CC requiring feedback according to the non-periodic trigger signaling comprises: the UE determining all DL CCs which send scheduling information on the first DL CC to be DL CCs requiring feedback; or the UE stores a correspondence between a DL CC and an Uplink Component Carrier (UL CC); the step of determining the DL CC requiring feedback according to the non-periodic trigger signaling comprises: the UE determining a first UL CC according to scheduling information bearing non-periodic trigger signaling, searching for a DL CC to which the first UL CC corresponds according to the stored correspondence between the DL CC and the UL CC, and determining the found DL CC to be the DL CC requiring feedback; or the base urine the UE to receive data on specified DL CCs; the step of determining the DL CC requiring feedback according to the non-periodic trigger signaling comprises: when the UE receives the non-periodic trigger signaling on one of the specified DL CCs, determining the specified DL CCs to be DL CCs requiring feedback; or the base station pre-configuring a first correspondence through a high-layer signalling, wherein the first correspondence is a correspondence between a DL CC receiving the non-periodic trigger signaling and the DL CC requiring feedback; the step of determining the DL CC requiring feedback according to the non-periodic trigger signaling comprises: the UE determining the DL CC requiring feedback to which the DL CC bearing the non-periodic trigger signaling corresponds according to the first correspondence; or the non-periodic trigger signaling is n bits, wherein n is more than 1; wherein each bit in the n bits corresponds to one DL CC, and when a value of a bit is a specified value, it indicates triggering the non-periodic feedback of a DL CC to which the bit corresponds; and the step of determining the DL CC requiring feedback according to the non-periodic trigger signaling comprises: the UE determining whether there is the specified value in the n bits, if so, determining the DL CC to which the bit, where the specified value is, corresponds to be the DL CC requiring feedback; or, a decimal number of the n bits corresponds to one DL CC, or the non-periodic feedback is not triggered; and the step of determining the DL CC requiring feedback according to the non-periodic trigger signaling comprises: the UE determining the DL CC to which the decimal number of the n bits corresponds to be the DL CC requiring feedback.

2. The method according to claim 1, wherein the first UL CC is an uplink component carrier for sending a Physical Uplink Shared Channel (PUSCH) which bears non-periodic feedback information.

3. The method according to claim 1, wherein the specified DL CCs are all DL CCs which are pre-configured to the UE by the base station and have a capability of receiving data.

4. The method according to claim 1, wherein the non-periodic trigger signaling is in a Downlink Control Information (DCI) Format domain which bears scheduling information of a PUSCH, and an overhead of the non-periodic trigger signaling is 1 bit, which indicates whether the non-periodic feedback is triggered.

5. The method according to claim 1, wherein a way of determining a value of n comprises one of the following:

the value of n being a maximum number of component carriers aggregated in a system; being a number of DL CCs which are configured to the UE by the base station and are used for transmitting a Physical Downlink Shared Channel (PDSCH); being a maximum number of carriers which are configured to the UE by the base station to schedule a DL CC on one DL CC; being a maximum number of carriers which are configured to the UE by the base station to schedule a DL CC on a DL CC sending the non-periodic trigger signaling.

6. The method according to claim 1, wherein during a cross-carrier scheduling, the non-periodic trigger signaling is a Carrier Indicator (CI) signaling used for the cross-carrier scheduling.

7. The method according to claim 6, wherein an uplink carrier for sending a PUSCH bearing non-periodic feedback information is predefined by the base station through a high-layer signaling.

8. The method according to claim 1, wherein the UE determines there are multiple DL CCs requiring feedback; the step of the UE triggering the non-periodic feedback of the determined DL CCs comprises:

the UE arranging channel quality information of the multiple DL CCs according to an order of frequency points or an order of indexes of the DL CCs, and sending the arranged channel quality information of the multiple DL CCs to the base station.

9. A system for non-periodic feedback in a carrier aggregation scenario, comprising a base station and a piece of UE; wherein the base station is configured to send a non-periodic trigger signaling to the UE;

the UE comprises:

a receiving module, which is configured to receive the non-periodic trigger signaling from the base station; and a triggering module, which is configured to determine a DL CC requiring feedback according to the non-periodic trigger signaling, and trigger a non-periodic feedback of the determined DL CC;

wherein the step of determining the DL CC requiring feedback according to the non-periodic trigger signaling comprises: the UE determining a DL CC bearing the non-periodic trigger signaling to be the DL CC requiring feedback; or the UE determines a DL CC bearing the non-periodic trigger signaling to be a first DL CC; and the step of determining the DL CC requiring feedback according to the non-periodic trigger signaling comprises: the UE determining all DL CCs which send scheduling information on the first DL CC to be DL CCs requiring feedback; or the UE stores a correspondence between a DL CC and an Uplink Component Carrier (UL CC); the step of determining the DL CC requiring feedback according to the non-periodic trigger signaling comprises: the UE determining a first UL CC according to scheduling information bearing the non-periodic trigger signaling, searching for a DL CC to which the first UL CC corresponds according to the stored correspondence between the DL CC and the UL CC, and determining the found DL CC to be the DL CC requiring feedback; or the base station pre-configuring the UE to receive data on specified DL CCs; the step of determining the DL CC requiring feedback according to the non-periodic trigger signaling comprises: when the UE receives the non-periodic trigger signaling on one of the specified DL CCs, determining the specified DL CCs to be DL CCs requiring feedback; or the base station pre-configuring a first correspondence through a high-layer signalling, wherein the first correspondence is a correspondence between a DL CC receiving the non-periodic trigger signaling and the DL CC requiring feedback; the step of determining the DL CC requiring feedback according to the non-periodic trigger signaling comprises: the UE determining the DL CC requiring feedback to which the DL CC bearing the non-periodic trigger signaling corresponds according to the first correspondence; or the non-periodic trigger signaling is n bits, wherein n is more than 1; wherein each bit in the n bits corresponds to one DL CC, and when a value of a bit is a specified value, it indicates triggering the non-periodic feedback of a DL CC to which the bit corresponds; and the step of determining the DL CC requiring feedback according to the non-periodic trigger signaling comprises: the UE determining whether there is the specified value in the n bits, if so, determining the DL CC to which the bit, where the specified value is, corresponds to be the DL CC requiring feedback; or, a decimal number of the n bits corresponds to one DL CC, or the non-periodic feedback is not triggered; and the step of determining the DL CC requiring feedback according to the non-periodic trigger signaling comprises: the UE determining the DL CC to which the decimal number of the n bits corresponds to be the DL CC requiring feedback.

* * * * *